Figure 1:
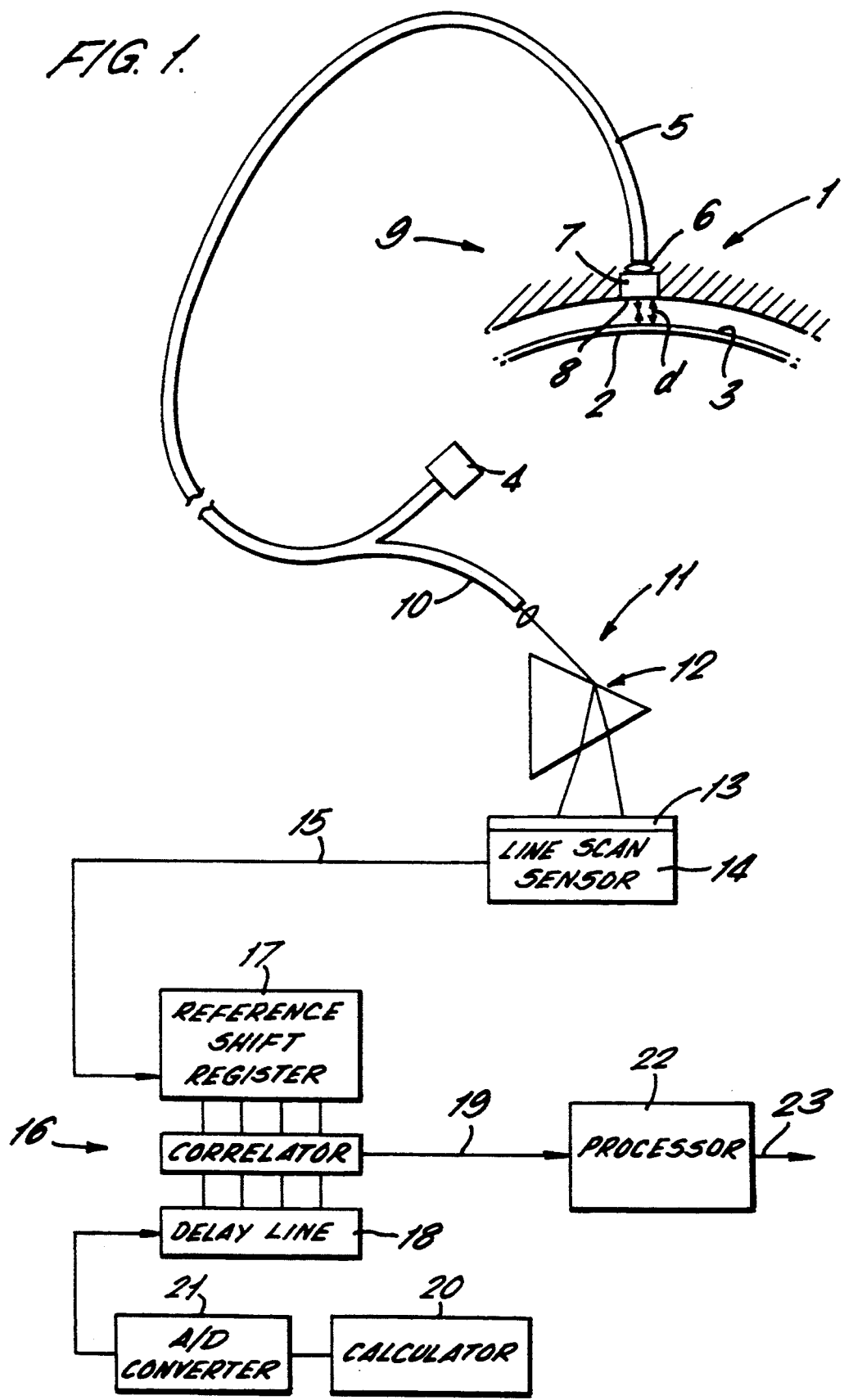

United States Patent [19]

Johnston

[11] Patent Number: 5,400,140
[45] Date of Patent: Mar. 21, 1995

[54] METHOD OF DECODING A SPECTRALLY MODULATED LIGHT SIGNAL

[75] Inventor: James S. Johnston, West Sussex, United Kingdom

[73] Assignee: Fisher-Rosemount Limited, West Sussex, United Kingdom

[21] Appl. No.: 260,204

[22] Filed: Jun. 10, 1994

Related U.S. Application Data

[63] Continuation of Ser. No. 909,784, Jul. 7, 1992, abandoned.

[30] Foreign Application Priority Data

Jul. 30, 1991 [GB] United Kingdom ............... 9116395

[51] Int. Cl.⁶ .................... G01L 13/02; G01B 9/00
[52] U.S. Cl. ........................ 356/345; 356/346; 356/357
[58] Field of Search ............. 356/345, 357, 358, 356, 356/346, 355

[56] References Cited

U.S. PATENT DOCUMENTS

| | | | |
|---|---|---|---|
| 4,885,709 | 12/1989 | Edgar et al. | 364/563 |
| 4,972,077 | 11/1990 | Willson et al. | 250/227.27 |
| 5,200,796 | 4/1993 | Leguime | 356/346 |
| 5,202,939 | 4/1993 | Belleville et al. | 385/12 |

FOREIGN PATENT DOCUMENTS 2086572B 5/1984 United Kingdom .
WO85/05673 12/1985 WIPO .

Primary Examiner—James C. Housel
Assistant Examiner—Long V. Le
Attorney, Agent, or Firm—Westman, Champlin & Kelly

[57] ABSTRACT

In a method of analyzing a spectrally modulated light signal received from an interferometric transducer the value of an optical path difference associated with a parameter to be remotely sensed is encoded as a characteristic frequency of spectral modulation in the received light. The intensity of the received light is measured at a number of wavelengths within a selected range of wavelengths to obtain data defining a measured spectrum. Reference data is generated to represent a theoretical spectrum corresponding to a nominal optical path difference, the reference data being generated for a greater range of wavelengths than the selected range of wavelengths of the measured spectrum. The measured spectrum is correlated with successive portions of the reference data to identify a portion of the reference data exhibiting correlation with the measured spectrum, and an output signal is then generated which is representative of the location of the correlating portion within the wavelength range of the reference data. The method provides improved resolution for remote sensing of parameters such as pressure.

9 Claims, 2 Drawing Sheets

METHOD OF DECODING A SPECTRALLY MODULATED LIGHT SIGNAL

This is a continuation of application Ser. No. 07/909,784, filed Jul. 7, 1992, now abandoned.

This invention relates to a method of analysing a spectrally modulated light signal received from an interferometric transducer or the like.

It is known from GB-2086572 to provide a transducer for measuring a physical parameter including an interferometer which provides an optical path difference which is variable in response to variation in the physical parameter. Physical parameters such as pressure or temperature for example can be readily encoded in this manner by arranging for a reflecting surface to be movable in response to a change in pressure or temperature respectively. Light transmitted by the interferometer is encoded with spectral information related to the optical path difference and analysis of the light by a receiver at a remote location enables the optical path difference and hence the value of the physical parameter to be remotely sensed.

GB-2086572 proposes counting minima or maxima in the received spectrum to determine the average frequency of spectral modulation over a selected portion of the spectrum and using the observed frequency to provide an output signal representative of the value of the physical parameter.

According to the present invention there is disclosed a method of analysing a spectrally modulated light signal received from an interferometric transducer or the like in which the value of an optical path difference associated with a parameter to be remotely sensed is encoded as a characteristic frequency of spectral modulation in the received light, the method including the steps of measuring the intensity of the received light at a number of wavelengths within a selected range of wavelengths to obtain data defining a measured spectrum, generating reference data representative of a theoretical spectrum corresponding to a nominal optical path difference, the reference data being generated for a greater range of wavelengths than the selected range of wavelengths of the measured spectrum, correlating the measured spectrum with successive portions of the reference data to identify a portion of the reference data exhibiting correlation with the measured spectrum, and generating an output signal representative of the location of the correlating portion within the wavelength range of the reference data.

An advantage of the present invention is that more efficient use is made of the information contained in the measured spectrum thereby resulting in improved resolution. The amount of computation required is minimised by requiring only a single theoretical waveform to be calculated.

Preferably the theoretical spectrum is represented by
$I = I_0(1 + \sin \pi d/4\lambda)$
where I is the received light intensity, $I_0$ is a constant, d is the optical path difference and $\lambda$ is the wavelength of received light.

Preferably the method includes the further step of processing said output signal to provide an indication of the value of optical path difference and/or its associated parameter.

The transducer may be operable to transmit a measured spectrum which simultaneously exhibits a plurality of distinct frequencies of spectral modulation corresponding to respective values of optical path difference, the method may then include the steps of identifying a corresponding plurality of portions of the reference data exhibiting correlation with the measured spectrum and generating output signals representative of the respective locations of the correlating portions within the wavelength range of the reference data.

A plurality of variable parameters may thereby be decoded from the received light signal by identifying respective correlating portions of the reference data.

The method may alternatively include the step of generating a binary output signal comprising a plurality of binary digits representing the presence or absence in the measured spectrum of respective frequencies of spectral modulation.

Such a method would be appropriate when used with a transducer of the type disclosed in co-pending application GB-9022969.1 in which a binary word is encoded by means of a Michelson interferometer such that specific frequencies of spectral modulation are associated with respective bits of a binary word. The binary word may for example represent positional information which is encoded using a pseudo random binary sequence.

The measured spectrum may conveniently be correlated with the reference data in a single chip hardware correlator.

Preferably the method includes the step of storing the measured spectrum in a reference register of the correlator, generating a reference data signal which varies in time with a waveform which represents the variation with wavelength of the theoretical spectrum, passing the reference data signal in stepped manner through a sampled delay line of the correlator and performing at each step a cross-correlation calculation between the contents of the reference register and data values sampled from the delay line to produce a correlation output at each step.

Preferably the method further includes the step of counting the number of steps taken to reach a peak in the correlation output and outputting the number of steps as a measure of the location of a correlating portion within the wavelength range of the reference data.

The interferometric transducer may be illuminated with a pulse of light of short duration and the corresponding pulsed light signal received from the transducer may then be analysed to sense the instantaneous value of the optical path difference. The instantaneous value of a varying parameter may thereby be sensed.

Figure 2:
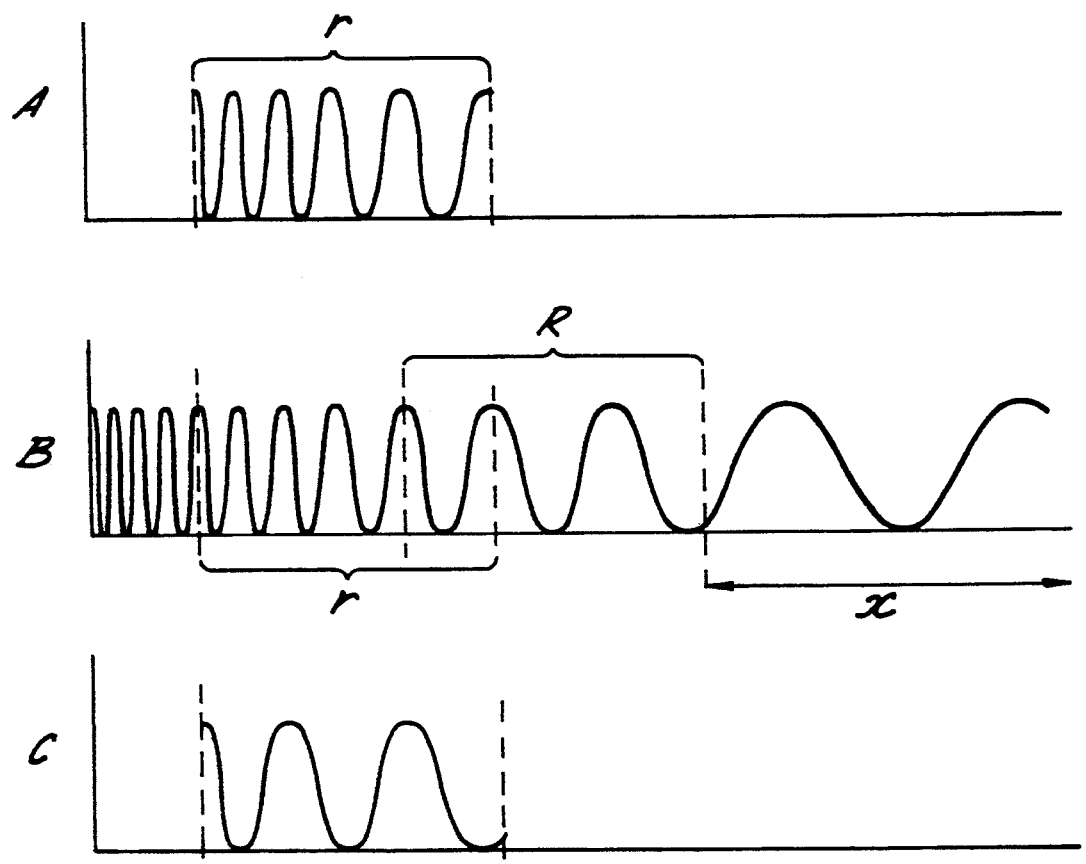

A particular embodiment of the present invention will now be described by way of example only and with reference to the accompanying drawings of which:

FIG. 1 is a schematic view of an interferometric pressure transducer coupled to a receiver having apparatus for decoding a spectrally modulated light signal; and FIG. 2 is an illustration of received and theoretical spectra.

In FIG. 1 a pressure transducer 1 comprises a pressure responsive diaphragm 2 having a light reflective surface 3. Light from a broad bandwidth source 4 is conducted to the transducer 1 along a light conductor 5. Light emerging from the conductor 5 at the transducer 1 is focussed by a lens system 6 through a transparent reference plate 7. A face 8 of the reference plate 7 is formed optically flat and parallel to the tangent to the surface 3 of the diaphragm 2 immediately adjacent the plate.

The face 8 of the plate 7 is made partially reflecting such that the transducer 1 constitutes a Fizeau interferometer 9 having an optical path difference d which is variable in response to movement of the diaphragm 2 and hence is responsive to variation in pressure.

Light output from the Fizeau interferometer 9 is conducted along the light conductor 5 which is bifurcated to provide an output arm 10 which conducts light to a receiver or analyser 11. The analyser 11 comprises a dispersive optical system 12 which disperses the various frequency components of the light received via the output arm 10 on to a photo detector array 13 so that the relative intensity or amplitude of the received light at different wavelengths can be measured. The resulting measured spectrum covers a range of wavelengths which is determined by the dispersive power of the optical system 12 and the size of the detector array 13.

The photo detector array 13 forms part of a line-scan sensor 14 which periodically scans the measured spectrum and provides an output 15 in serial analogue format. The output 15 is connected to a single-chip hardware correlator 16 and is input to a reference shift register 17 of the correlator.

The correlator 16 has a sample-and-hold facility which is actuated to store in the reference shift register 17 a single scan of the measured spectrum as a series of 256 sampled signal levels. The waveform of the measured spectrum as stored in the correlator 16 is illustrated in FIG. 2 at waveform A which represents the variation of intensity with increasing wavelength. The waveform A exhibits a series of peaks corresponding to constructive interference in the interferometer and troughs corresponding to destructive interference, the waveform being generally sinusoidal with a pitch which increases progressively with increasing wavelength of the received light. The waveform pitch, i.e. the spacing between adjacent peaks or troughs, is to a first approximation inversely proportional to the magnitude of the optical path difference prevailing in the interferometer 9.

The correlator 16 is arranged to perform a cross-correlation between the contents of the reference shift register 17 and the contents of a 256 point tapped CCD (charge coupled device) delay line 18 and produce a correlation output 19. The cross-correlation calculation comprises the summation of the 256 values obtained by multiplying each signal level in the shift register 17 with a corresponding signal level of the delay line 18.

An electronic calculator 20 computes theoretical values of spectral intensity as a function of incrementally increasing values of wavelength. The correlator 16 is of a type designed for processing analogue signals and the output of the calculator is therefore converted to analogue form by an analogue-to-digital converter 21 prior to being input to the delay line 18 of the correlator 16. The output of the analogue-to-digital convertor 21 is therefore a voltage which varies with time such as to have a waveform which corresponds to the waveform of the theoretical spectrum as a function of wavelength. The calculator 20 provides theoretical spectral data for a range of wavelengths which is several times broader than the range of wavelengths represented in the references shift register 17 as the measured spectrum. The theoretical spectrum as calculated is illustrated at waveform B in FIG. 2.

Delay line 18 acts as a shift register which, in response to successive clock pulses, incrementally shifts data values representing waveform B through the correlator 16 and at each clock pulse a respective correlation coefficient is calculated and appears at the correlation output 19. During this procedure, a selected portion R of the waveform B in FIG. 2 is represented in the delay line 18. With successive clock pulses the location of the portion R moves progressively from one end of the waveform to the other. A peak in the correlation output 19 will be observed when the position of R is such as to provide a best fit with the measured spectrum waveform A.

The theoretical spectrum is calculated for a nominal value D of optical path difference. If the optical path difference d happens to be equal to the nominal optical path difference D then the correlation output 19 will peak when the location of R coincides with the wavelength range r of the measured spectrum. At other values of d the correlation output 19 will peak when the portion R is at a different location. If for example the actual value of optical path difference in the interferometer decreases to a value d which is less than D then the waveform of the measured spectrum will change to that shown in waveform C in which the waveform is seen to exhibit an increase in pitch i.e. fewer peaks and troughs appear within wavelength range r. In FIG. 2, the bracket R represents that portion of the theoretical waveform B which is a good fit with measured spectrum waveform C and as illustrated R is offset in wavelength from r. Correlation output 19 will therefore peak when the measured spectrum is correlated against the portion R.

The correlator output 19 is connected to a processor 22 which counts the number of clock pulses taken to reach peak correlation between the theoretical spectrum and the measured spectrum.

The measured number of clock pulses corresponds to a unique value of optical path difference d and by suitable calibration the processor 22 is programmed to produce an output signal in the format required which may for example be a digital output for driving an alphanumeric display.

The processor may alternatively be adapted to calculate an absolute value of optical path difference from known values of wavelength together with a knowledge of the nominal value D of optical path difference. The upper and lower wavelengths delineating the correlating portion R of the theoretical waveform B can be deduced from the number of clock pulses taken to reach peak correlation since the number of pulses multiplied by the wavelength increment between successive data values gives the shift in wavelength x required to achieve correlation. The value of optical path difference d can then be deduced from a knowledge of the theoretical waveform.

In the above examples the theoretical waveform is of the form $$I = I_o \left( 1 + \sin \frac{\pi d}{4\lambda} \right) \quad (1)$$

Alternative forms of theoretical waveform can be used for the purpose of obtaining correlation provided that the waveform provides a modulation which increases progressively in pitch with increasing wavelength of the received light. Satisfactory correlation with the measured spectrum may for example be obtained using a sawtooth or square wave profile.

The method of the present invention may be used with various types of sensor such as for example a temperature sensor where a reflecting surface of the interferometer moves in response to expansion or contraction of a temperature sensing element. Other physical variables may also be sensed by appropriate sensor construction.

The processor 22 may also be programmed to identify more than one peak in the correlation output 19 during a single pass of the theoretical waveform through the delay line 18. In such an arrangement the processor may be arranged to provide a number of outputs each indicating whether a respective frequency of spectral modulation is present in the received light. It is therefore possible to decode a binary encoded word in which for example binary 1 is represented by the presence of a particular frequency spectral modulation and by binary 0 by the absence of such a frequency. An interferometric sensor capable of encoding such binary words is disclosed in our copending application GB-9022969.1.

Alternative methods of performing the correlation procedure are possible such as using a computer to process digitally sample values of measure spectrum against an internally computed theoretical spectrum.

The preferred embodiment described above utilises a broad bandwidth light source. It will be apparent that the bandwidth need only be sufficient for the spectral modulation resulting from interference to be measurable. A light emitting diode (LED) may for example be used. Additional LED's may be provided to extend the bandwidth if necessary.

In a typical application the source is pulsed to produce a flash of 100 microseconds duration. The period between successive pulses depends upon the time taken for the cross-correlation calculation to be performed but is typically 10 miliseconds.

The measured spectrum will have an envelope which is largely determined by the spectral characteristics of the light source and may further be influenced by other characteristics of the transducer and the relative sensitivities of the elements forming the photo detector array 13. Improved correlation may be obtained by compensating for non-uniformity in the envelope. The measured spectrum may be corrected using calibration data obtained for each element of the photo detector array 13. Alternatively the compensation may be applied to the theoretical spectrum by a computation within the correlator 16 which would apply a multiplying factor at each point of the delay line 18.

I claim:

1. A method of analyzing a spectrally modulated light signal received from a transducer in which a value of an optical path difference associated with a parameter to be remotely sensed is encoded as a characteristic frequency of spectral modulation in the received light, the method comprising the steps of measuring the intensity of the light signal at a number of wavelengths within a selected range of wavelengths to obtain data comprising a set of measurement data values and defining a measured spectrum, generating reference data comprising a set of reference data values and being representative of a single theoretical spectrum corresponding to a nominal optical path difference, the reference data being generated for a greater range of wavelengths than the selected range of wavelengths of the measured spectrum, correlating the measured spectrum with successive portions of said reference data to identify a correlating portion of the reference data exhibiting correlation with the measured spectrum, each correlation being carried out using substantially all of the measurement data values of the measured spectrum and an equal number of said reference data values of said reference data, and generating an output signal representative of a location of the correlating portion within the wavelength range of the reference data.

2. A method as claimed in claim 1 wherein the theoretical spectrum is represented by $$I = I_o\left(1 + \sin\frac{\pi d}{4\lambda}\right)$$

where I is received light intensity, $I_o$ is a constant, d is the optical path difference and $\lambda$ is the wavelength of received light.

3. A method as claimed in claim 1 including the step of processing said output signal to provide an indication of the value of optical path difference and/or the parameter.

4. A method as claimed in claim 1 wherein the measured spectrum simultaneously exhibits a plurality of distinct frequencies of spectral modulation corresponding to respective values of optical path difference, the method including the step of identifying a corresponding plurality of portions of the reference data exhibiting correlation with the measured spectrum and generating output signals representative of the respective locations of the correlating portions within the wavelength range of the reference data.

5. A method as claimed in claim 4 including the step of generating a binary output signal comprising a plurality of binary digits representative of the presence in the measured spectrum of respective frequencies of spectral modulation.

6. A method as claimed in claim 1 wherein the measured spectrum is correlated with the reference data in a single chip hardware correlator.

7. A method as claimed in claim 6 including the step of storing the measured spectrum in a reference register of the correlator, generating a reference data signal which varies in time with a waveform which represents the variation with wavelength of the theoretical spectrum, passing the reference data signal in stepped manner through a sampled delay line of the correlator and performing at each step a cross-correlation calculation between the contents of the reference register and data values sampled from the delay line to produce a correlation output at each step.

8. A method as claimed in claim 7 including the step of counting the number of steps taken to reach a peak in the correlation output and outputting the number of steps as a measure of the location of a correlating portion within the wavelength range of the reference data.

9. A method as claimed in claim 1 including the step of illuminating the interferometric transducer with a pulse of light and analysing the corresponding pulsed light signal received from the transducer to sense an instantaneous value of the optical path difference.

* * * * *